United States Patent Office 3,132,123
Patented May 5, 1964

3,132,123
POLYMERS OF PERFLUOROALKOXY PERFLUOROVINYL ETHERS
John Ferguson Harris, Jr., Wilmington, Del., and Donald Irwin McCane, Marietta, Ohio, assignors to E. I. du Pont de Nemours and Company, Wilmington, Del., a corporation of Delaware
No Drawing. Filed Nov. 25, 1960, Ser. No. 71,392
10 Claims. (Cl. 260—87.5)

The present invention relates to novel fluorinated polymeric materials, and more particularly to polymers of perfluorinated vinyl ethers.

Polymeric materials derived from fluorinated monomers such as tetrafluoroethylene have become well known for their outstanding physical properties such as toughness, corrosion resistance and thermal stability. Polytetrafluoroethylene having these outstanding properties has, however, an extremely high melt viscosity due to its high molecular weight, which makes melt fabrication of the polymer very difficult. It has heretofore been found that the melt flow of tetrafluoroethylene polymers could be increased by copolymerization with ethylenically unsaturated monomers. However, many of the copolymers are either difficult to prepare or have properties which do not come close to the outstanding properties of polytetrafluoroethylene. The polymers and copolymers of the present invention were developed in the search for plastics which combine the outstanding physical properties of polytetrafluoroethylene with high enough melt flow to allow their fabrication by melt extrusion or injection molding.

In accordance with the present invention, high molecular weight polymers are obtained by the polymerization of perfluorovinyl ethers having the general formula:

$$CR_2=CF-OR$$

wherein R is a perfluoroalkyl radical. The perfluorovinyl ethers may further be copolymerized with halogenated ethylenes, and particularly with tetrafluoroethylene, vinyl fluoride, vinylidene fluoride and hexafluoropropylene to give rise to high molecular weight solid copolymers.

The perfluorovinyl ethers employed in the present invention are preferably those having from 1 to 5 carbon atoms in the alkoxy radical (RO), although vinyl ethers having more than 5 carbon atoms in the alkoxy radical are also useful. Examples of the perfluoroalkyl perfluorovinyl ethers are perfluoromethyl perfluorovinyl ether, perfluoropropyl perfluorovinyl ether, etc.

Perfluorovinyl ethers are prepared by the electrolytic fluorination of 2-alkoxy propionic acids using techniques well established in the art, followed by the decarboxylation and defluorination of the sodium salt of the perfluorinated 2-alkoxypropionic acid which leads to the formation of the perfluoroalkyl perfluorovinyl ether.

The perfluoro-2-alkoxypropionic acid, having the general formula

where $R_f$ is a perfluorocarbon radical, may also be prepared by the reaction of hexafluoropropylene epoxide with a perfluorinated alkyl acid fluoride which results in the perfluoro-2-alkoxypropionyl fluoride that can be hydrolyzed and decarboxylated or directly decarboxylated to the perfluorinated vinyl ether.

The preparation of the perfluorovinyl ethers employed in the present invention is illustrated by the following experimental procedures.

Into a glass vessel was charged 30 g. of cesium fluoride and 75 ml. of diethylene glycol dimethyl ether. The vessel was cooled to −80° C., evacuated and 66 g. of carbonyl fluoride and 83 g. of hexafluoropropylene epoxide were charged to the vessel. The vessel was heated to 75° C. for 4 hours. Low temperature distillation of the resulting product afforded 82 g. of perfluoro-2-methoxypropionyl fluoride, B.P. 10–12° C. The propionyl fluoride was dehalocarbonylated by passage through a bed of dry potassium sulfate pellets at 300° C. for a contact time of 10 min. A 60% yield of perfluoromethyl perfluorovinyl ether, B.P. −22° C., was obtained.

The perfluorovinyl ethers are highly reactive monomers which are polymerized by minor quantities of oxygen at elevated temperatures. Preferably, however, free radical catalysts such as are produced from peroxides and azo compounds are employed to initiate the polymerization. Pressure and temperature may be varied over a wide range. However, temperatures in the range of 0 to 100° C. are preferred, since the polymer formed in that range is a tough, high molecular weight solid. The polymerization may be carried out in bulk or in the presence of an inert diluent such as water or a perfluorinated solvent. The copolymerization of the perfluorovinyl ethers with tetrafluoroethylene can be carried out in an aqueous phase employing polymerization procedures such as described in U.S. 2,559,752 or in a perfluorinated solvent phase employing polymerization procedures such as described in U.S. 2,952,669. The polymerization procedures applicable to the monomers of the present invention being known, no further elaboration thereof is deemed necessary.

The preparation of the perfluorovinyl ether polymers is further illustrated by the following examples.

Example I

A 100 ml. stainless steel autoclave fitted with a magnetically driven stirring blade was flushed with nitrogen and evacuated. A solution of 10 g. (0.06 mol) of perfluoromethyl perfluorovinyl ether in 64 ml. of perfluorodimethylcyclobutane was admitted to the autoclave. The solution was heated to 60° C. and then tetrafluoroethylene was pressured into the autoclave until a pressure of 300 p.s.i.g. was attained. Approximately $10^{-4}$ mol of $N_2F_2$ diluted with $N_2$ was added to the rapidly stirred mixture. The contents of the autoclave were heated with stirring for 45 minutes at 60° C., and then cooled to room temperature and vented to atmospheric pressure. Solid polymer, weighing 11.4 g. was obtained. The melt viscosity of the copolymer at 380° C. was $16\times10^4$ poises. Infrared analysis of films of the resin pressed at 350° C. and 25,000 pounds platen pressure indicated that the copolymer contained 11.3 wt. percent perfluoromethyl perfluorovinyl ether. The films of the copolymer were tough, transparent and colorless.

Example II

Into an evacuated stainless steel 100 ml. autoclave fitted with a magnetically driven stirrer was placed a solution of 9 g. of perfluoropropyl perfluorovinyl ether (0.034 mol) in 64 ml. of perfluorodimethylcyclobutane. The solution was heated to 60° C., whereupon tetrafluoroethylene was admitted to the autoclave until a pressure of 268 p.s.i.g. was attained. To the rapidly stirred mixture was added approximately $10^{-4}$ mol of $N_2F_2$ diluted with nitrogen. The contents of the autoclave were heated and stirred for 1 hour at 60° C., and then cooled and gaseous materials vented off. The solid polymer obtained weighed 15.0 g. and had a melt viscosity at 380° C. of $3.6\times10^4$ poises. Films of the copolymer pressed at 350° C. and 20,000 pounds platen pressure were tough, clear and colorless. Infrared analysis of the resin indicated the presence of 9.7 wt. percent perfluoropropyl perfluorovinyl ether.

Example III 100 ml. stainless steel autoclave fitted with a magnetically driven stirrer is flushed with nitrogen and evacuated. A solution of 9 g. (0.0175 mol) of n-perfluorooctyl perfluorovinyl ether in 64 ml. of perfluorodimethylcyclobutane is added to the autoclave and heated to 60° C. Tetrafluoroethylene is then added to the autoclave until a pressure of 275 p.s.i.g is attained, whereupon approximately $10^{-4}$ mol of $N_2F_2$ diluted with nitrogen is introduced to the stirred mixture. After 1 hour, the contents of the autoclave are cooled to room temperature and vented to atmospheric pressure. A high molecular weight copolymer of tetrafluoroethylene, an n-perfluorooctyl perfluorovinyl ether, is obtained.

Example IV

A platinum tube, 0.5″ x 7″, sealed at one end, was evacuated and cooled to −196° C. The tube was charged with 4.25 g. of perfluoromethyl perfluorovinyl ether and .012 g. of $N_2F_2$ (nitrogen difluoride) as a mixture of the cis and trans isomers. The tube was sealed in vacuo at −196° C. and placed in a stainless steel autoclave. It was pressured to 4000 atm. with nitrogen and heated to 100° C. for 2 hrs. There was obtained 1.7 g. (40%) of a tough elastomeric polymer of perfluoromethyl perfluorovinyl ether. The polymer was soluble in perfluoro-1,3-dimethylcyclobutane and fluorocarbon solvent FC-75 obtained from Minnesota Mining and Mfg. Co. The polymer exhibited an inherent viscosity of 0.4 measured at 24° C. as a 0.43% solution in the latter solvent. It could be pressed to an elastomeric film at 58° and 5000 lbs. ram pressure.

Example V

A platinum tube, 0.25″ x 8″, sealed at one end was evacuated and cooled to −78° C. The tube was charged with 1.6 g. of perfluoropropyl perfluorovinyl ether. The tube was cooled to −196° C. and charged with 0.078 mg. of $N_2F_2$ (nitrogen difluoride) as a mixture of the cis and trans isomers. The tube was sealed in vacuo at −196° C. and placed in a high pressure apparatus. It was pressured to 18,000 atm. at room temperature for 20 hrs. There was obtained 1.0 g. (62.5%) of a solid polymer of perfluoropropyl perfluorovinyl ether. The polymer was soluble in perfluoro-1,3-dimethylcyclobutane and fluorocarbon solvent FC-75 obtained from the Minnesota Mining and Mfg. Co. It exhibited an inherent viscosity of 0.25 measured at 25° C. as a 0.32% solution in the latter solvent. It could be pressed to a stiff, flexible, clear film at 100° C. and 40,000 p.s.i.

The examples have illustrated the preparation of polymers which have a fluorinated polymer chain structure with pendent alkoxy groups, and are characterized in containing a plurality of groups of the formula:

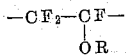

where R is perfluoroalkyl. The number of difluoromethylene radicals between the fluoroalkoxy radicals is one in the case of the homopolymer and will become increasingly greater than one as the perfluorovinyl ether is copolymerized with increasing amounts of tetrafluoroethylene. Although the examples have illustrated the preparation of only some of the polymers of the present invention, it is to be understood that perfluorovinyl ethers in which the perfluoroalkoxy group has a larger number of carbon atoms may be employed to form the polymers of the present invention.

The properties of the polymers and copolymers of the present invention will, of course, vary with the type of perfluorovinyl ether employed and with the amount of tetrafluoroethylene copolymerized with the perfluorovinyl ether. The polymers of the present invention are high molecular weight solids which have increasing elastomeric characteristics as the amount of the pendent perfluoroalkoxy radical in the polymer chain is increased and as the chain length of the perfluoroalkoxy radical is increased. These polyvinyl ethers in contrast to polytetrafluoroethylene have sufficient melt flow to make their fabrication by conventional techniques such as injection molding and melt extrusion possible.

The high molecular weight solid polymers and copolymers of the present invention are useful for a wide range of applications. The polymeric perfluorovinyl ethers can be compression molded and injection molded into massive articles or melt extruded into film and funicular structure such as tubing and fibers. The copolymers are further suitable for wire coating to provide electrical insulation and for other types of coatings. The poly(perfluorovinyl ethers) can be admixed with stabilizers, fillers, or pigments to improve certain characteristics of the polymer.

The present application is a continuation-in-part of copending application Serial No. 618,435, filed October 26, 1956.

We claim:

1. A normally solid polymer selected from the class consisting of homopolymers of perfluoroalkyl perfluorovinyl ethers and copolymers of perfluoroalkyl perfluorovinyl ethers with tetrafluoroethylene, said ether having the formula $C_nF_{2n+1}$—O—CF=CF$_2$, where $n$ is a number from 1 to 5 inclusive.

2. A normally solid homopolymer of a perfluoroalkyl perfluorovinyl ether having the formula $$C_nF_{2n+1}-O-CF=CF_2$$

where $n$ is from 1 to 5 inclusive.

3. A normally solid copolymer of a perfluoroalkyl perfluorovinyl ether and tetrafluoroethylene, said ether having the formula $C_nF_{2n+1}$—O—CF=CF$_2$, where $n$ is from 1 to 5 inclusive.

4. A normally solid homopolymer as set forth in claim 2 wherein the alkyl perfluorovinyl ether is perfluoromethyl perfluorovinyl ether.

5. A normally solid homopolymer as set forth in claim 2 wherein the perfluorovinyl ether is perfluoropropyl perfluorovinyl ether.

6. A normally solid copolymer as set forth in claim 3 wherein the perfluorovinyl ether is perfluoromethyl perfluorovinyl ether.

7. A normally solid copolymer as set forth in claim 3 wherein the perfluorovinyl ether is perfluoropropylvinyl ether.

8. The product of claim 1 in the form of a molded object.

9. The product of claim 1 in the form of a film.

10. The product of claim 1 in the form of a funicular structure.

References Cited in the file of this patent

UNITED STATES PATENTS

| | | |
|---|---|---|
| 2,559,752 | Berry | July 10, 1951 |
| 2,799,712 | Croix et al. | July 16, 1957 |
| 2,917,548 | Dixon | Dec. 15, 1959 |

UNITED STATES PATENT OFFICE
CERTIFICATE OF CORRECTION

Patent No. 3,132,123                                  May 5, 1964

John Ferguson Harris, Jr., et al.

It is hereby certified that error appears in the above numbered patent requiring correction and that the said Letters Patent should read as corrected below.

Column 1, line 36, for "$CR_2=CF-OR$" read -- $CF_2=CF-OR$ --.

Signed and sealed this 3rd day of November 1964.

(SEAL)
Attest:

ERNEST W. SWIDER                                 EDWARD J. BRENNER
Attesting Officer                                    Commissioner of Patents